June 1, 1926. 1,587,240

O. B. OLSON

DENTAL CUSPIDOR TRAP

Filed Oct. 11, 1923

Inventor
Orville B. Olson
By Bair & Freeman Attys

Witness
Lynn Latta

Patented June 1, 1926.

1,587,240

UNITED STATES PATENT OFFICE.

ORVILLE B. OLSON, OF WEBSTER CITY, IOWA.

DENTAL CUSPIDOR TRAP.

Application filed October 11, 1923. Serial No. 667,861.

The object of my invention is to provide a dental cuspidor arranged in the waste water line of the cuspidor for collecting any precious metals which may be discharged into the cuspidor during ordinary dental work.

Still a further object is to provide a dental cuspidor trap arranged to be suspended from the cuspidor and capable of being bodily removed as a single unit whereby the metals collected within the trap may be saved and later refined.

Still a further object is to provide a two-part trap arranged with a non-metallic basin, in which part is received a mercury solution so that the metals passing through the trap will become united with the mercury while the waste water passing through the trap will be discharged through openings formed in the trap.

My present invention is an improvement on my co-pending application, Serial No. 640,415, filed May 21, 1923.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 4:
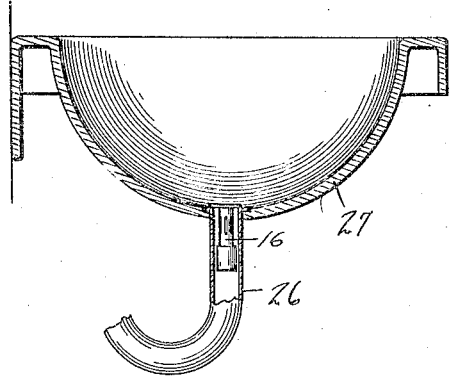
Figure 4 is a sectional view of a lavatory or wash basin showing my trap installed therein.
Figure 3:
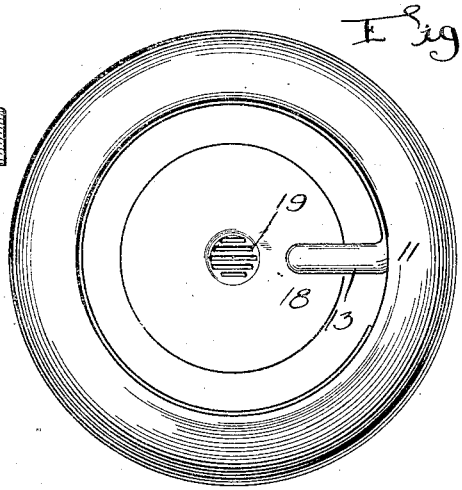
Figure 3 is a top, plan view of the cuspidor showing the location of the trap.
Figure 1:
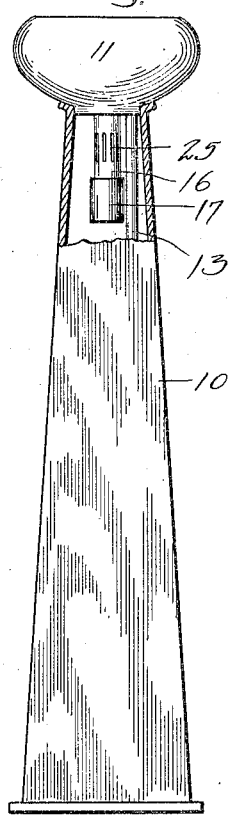
Figure 1 is a side elevation of a dental cuspidor and pedestal therefor, parts being broken away to better illustrate the position of the trap.

In the accompanying drawings, I have used the reference numeral 10 to indicate generally a pedestal for supporting a dental cuspidor 11.

The dental cuspidor 11 is preferably formed of glass or some other non-metallic substance and is provided in its bottom with a discharge or outlet opening 12.

A water supply pipe 13 passes up through the bottom of the cuspidor 11 and is arranged with a ring at its upper end as at 14. The ring or portion 14 extends adjacent the upper edge of the cuspidor 11, and is provided with a number of openings 15 wherein the water passing through the pipe 13 will be discharged and given a whirling motion within the cuspidor 11. The parts just described are of the ordinary construction.

My improved trap is suspended from the cuspidor 11 and extends through the discharge opening 12 ordinarily formed therein.

The trap comprises a pair of cylinder parts 16 and 17. The part 16 is formed with a flange 18 at its upper end wherein it is supported from the cuspidor 11. The upper end of the part 16 is also provided with a perforated plate 19 through which the water from the cuspidor must pass.

The plate 19 takes the place of the ordinary perforated plate provided in a cuspidor of this kind, or in the ordinary lavatory or wash basin. The plate 19 is formed integral with the cylinder or plate 16 of my device.

The lower end of the cylinder 16 is screw threaded as at 20, so as to coact with the interior screw-threads 21 formed on the upper end of the cylinder 17. The cylinder 17 is formed with a bottom 22.

The opening 12 in the cuspidor 11 is of sufficient diameter to permit the entire trap device to be bodily removed therefrom, as a complete unit.

A non-metallic basin 23 is placed within the plate 17 and below the part 16, as clearly shown in Figure 2 of the drawings.

The basin 23 is ordinarily filled with a mercury solution 24.

The side of the part 16 above the part 17 is formed with a number of openings 25 wherein the water passing into the trap through the plate 19 may be discharged therefrom through the openings 25.

In this connection, it may be mentioned that any gold dust or other metals used in connection with dental work and discharged into the dental cuspidor, will pass into the trap through the plate 19 and downwardly into the mercury solution 24, while the water will be discharged through the openings 25.

The entire trap may be removed and the parts 16 and 17 separated wherein the basin 23 can be withdrawn from the parts 17 and the mercury solution as well as any metals therein saved.

Figure 2:
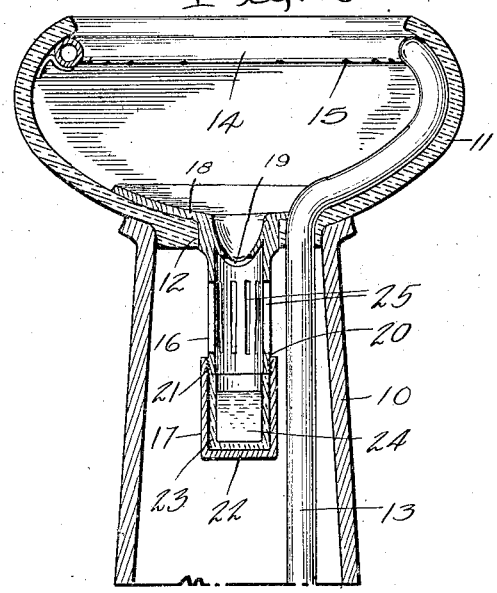
Figure 2 is an enlarged sectional view through the cuspidor and my improved trap.

In Figure 4 of the drawings, I have shown the trap which is similar in construction to that shown in Figure 2 of the drawings, arranged in the waste water line 26 of an ordinary lavatory or wash basin 27.

While I have referred to a dental cuspidor trap, yet it will be understood that my invention may be used with an ordinary lavatory or wash basin in any lavatory or dental shop or the like, where precious metals are handled.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. In combination with a dental cuspidor having an outlet opening in the bottom thereof, a precious metal trap unit comprising a tubular portion having a flange around the upper edge thereof for resting on the bottom of the cuspidor, a mercury cup arranged below and abutting against said tubulur portion and a casing for said cup designed to coact with the lower end of said tubular portion for retaining said cup thereagainst.

2. In combination with a dental cuspidor having an outlet opening in the bottom thereof, a precious metal trap unit comprising a tubular portion having a flange around the upper edge thereof for resting on the bottom of the cuspidor, a mercury cup arranged below and abutting against said tubular portion and a casing for said cup having internal screw threads in the upper end thereof for coacting with external screws threads on said tubular member whereby said cup is removably positioned in the unit and slotted openings in said tubular portion between said flange and said vertical slots.

Des Moines, Iowa, August 13, 1923.

ORVILLE B. OLSON.